United States Patent [19]

Belz

[11] Patent Number: 4,612,355
[45] Date of Patent: Sep. 16, 1986

[54] PROCESS FOR THE PERFORMANCE OF CHEMICAL REACTIONS, MORE PARTICULARLY FOR THE MANUFACTURE OF PLASTICS BY MEANS OF EXTRUDERS AND APPARATUS FOR THE PROCESS

[75] Inventor: Roland K. Belz, Leinfelden-Echterdingen, Fed. Rep. of Germany

[73] Assignee: RB Kunststoffpatent- Verwertungs AG, Fed. Rep. of Germany

[21] Appl. No.: 645,296

[22] Filed: Aug. 29, 1984

[30] Foreign Application Priority Data

Oct. 4, 1983 [DE] Fed. Rep. of Germany ....... 3335954

[51] Int. Cl.$^4$ ................................................ C08F 2/02
[52] U.S. Cl. ......................................... 526/65; 526/88
[58] Field of Search ..................................... 526/65, 88

[56] References Cited

U.S. PATENT DOCUMENTS

| | | | |
|---|---|---|---|
| 2,693,348 | 11/1954 | Ellermann et al. | 259/41 |
| 3,727,678 | 4/1973 | Schott, Jr. | 165/64 |
| 3,744,770 | 7/1973 | Ocker et al. | 259/192 |
| 4,272,466 | 6/1981 | Harris | 264/40.6 |
| 4,487,897 | 12/1984 | Matsuoka et al. | 526/88 X |

OTHER PUBLICATIONS

Extrusion of Plastics, Fisher, 1964, pp. 114–126.
Plastics Extrusion Technology, Griff, 1968, pp. 324–325.

*Primary Examiner*—Paul R. Michl
*Attorney, Agent, or Firm*—Steele, Gould & Fried

[57] ABSTRACT

The invention relates to a process for the performance of chemical reactions, more particularly for the production of plastics by means of extruders. The conveying path in the extruder is subdivided into different temperature zones whose temperature can be adjusted independently of one another. As a result, numerous chemical reactions can be performed in a controlled and continuous manner. The invention also relates to an apparatus for the performance of the process, the corresponding extruders having separately temperable casing compartments and being equipped with independent tempering devices. Application to chemical reactors for light to medium production runs.

30 Claims, 6 Drawing Figures

PROCESS FOR THE PERFORMANCE OF CHEMICAL REACTIONS, MORE PARTICULARLY FOR THE MANUFACTURE OF PLASTICS BY MEANS OF EXTRUDERS AND APPARATUS FOR THE PROCESS

The invention relates to a process for the performance of chemical reactions, more particularly for the production of plastics by means of extruders, and also to an apparatus for the performance of the process.

BACKGROUND OF THE INVENTION

Extruders for processing plastics require a relative large amount of energy in operation, and the required precise temperature control is frequently not possible, even if the extruders have an electric heating system and cooling coils for a cooling liquid. It has also been suggested to produce thermoplastics on extruders, but hitherto that type of production could not become successfully established, due to the difficulties involved. However, there is a need for versatile reactors which can be used for various chemical reactions, are designed for low to medium production runs and can be re-equipped at low cost.

PROBLEM

It is therefore an object of the invention to provide a process for the performance of chemical reactions, more particularly for the production of plastics by means of extruders and also apparatuses suitable for this purpose, which allow the controlled performance of various kinds of chemical reactions, more particularly the production of thermoplastics.

BRIEF SUMMARY OF THE INVENTION

To this end according to the invention a highly sensitive temperature control is provided for the extruder, which enables precise temperature limits to be obtained. To this end the conveying path of the extruder is subdivided into various temperature zones, the temperature in the zones being adjusted individually and independently. Advantageously at least five temperature zones are provided, and as a rule five to fifteen and more zones, the preferred number being about ten zones per extruder. The number of zones substantially depends on the temperature sensitivity of any reaction to be performed. For example, a predetermined temperature profile can be forced on the conveying path in the extruder, so that in spite of the continuous conveyance of the material, chemical reactions taking place during passage of the conveying path are localized to predetermined zones. This enables various kind of chemical reactions to be carried out with one apparatus and one extruder, the course of the process being preferably fully automatically controlled. To this end the individual process parameters for each individual reaction can be provided in a program which was drawn up via a computer with the help of a similar kind of extruder. Using such an apparatus, for example, quantities of the order of magnitude of 10 to 20,000 tonnes can be produced annually.

In a preferred embodiment of the invention the temperature zones are tempered exclusively by means of fluids, more particularly liquids, which flow through the temperature zones. The abandonment of an electric heating system means that the extruder can be constructed explosion-proof, and this is preferred. The tempering according to the invention can also be performed very sensitively, so that temperature tolerances below 1° C. and even down to 0.1° C. can be maintained. For this purpose preferably two fluids of the same nature, but different temperatures are mixed by the fluid entering the temperature zone to maintain the required temperature being able to absorb or give off quantities of heat, with as small temperature differences as possible. For example, the temperature difference t between the fluid inlet and the fluid outlet of the temperature zone can be maintained below 3° C. and even below 1° C. in dependence on the sensitivity of the reaction. The rapidity of the tempering is improved by the fluids being mixed immediately upstream of the particular temperature zone. Preferably the temperature of one fluid differs by less than 5° C., preferably by less than 3° C. from the required temperature of the corresponding temperature zone, whereas the temperature of the other fluid can advantageously be further away. This can be further boosted by also altering the quantity of the fluid flowing through the particular zone. The time spent by the participants in the reaction in the individual temperature zones can also differ; preferably it is lower in zones with a high necessary heat exchange, so that the area wetted per unit of time between the material to be treated and the extruder is increased.

Such steps enable chemical reactions to be controlled so precisely that, for example, in polymerization processes the value of the molecular weight of the polymers can be influenced. Thus, for example, cooling can prevent reactions until the participants in the reaction have been adequately mixed, whereafter a very rapid and controlled start can be made by following the initial cooling by a rapid heating to the required temperature.

Using the extruder, reactions can also be performed at elevated pressure or in vacuo, on construction that the extruder is constructed pressure-tight. The screws of the extruder can also preferably be driven at various speeds. If, contrary to expectations, a reaction should proceed too violently, again with program control a high speed can be introduced, thereby producing the rapid ejection of the material and therefore the self-cleaning of the extruder.

The process according to the invention can be used to perform both single-phase and multi-phase reaction. Parts of the reaction mixture or reaction medium can be separated before the required product leaves the extruder. For example, liquid components can be separated from solid components by known screening devices. However, volatile components of the reaction mixture can also be separated by distillation. Such distillation can be carried out at surrounding pressure. However, distillation in vacuo is also possible; in that case advantageously, if necessary, the damming of pressure at a place on the conveying path lying upstream of the distillation place prevents volatile participants in the reaction from being drawn off from the still unreacted reaction medium. Such damming or throttling can be produced in various ways, for example, by the screws of the extruder having non-conveying or counter-conveying elements. Two or more extruders can also be connected in series, in which case the ejection nozzle of one extruder forms the throttling device upstream of the distillation unit disposed in the following extruder. In contrast with the conventional degasifying systems, which remove only a small percentage of entrained volatile substances, with such distillation systems solvents, or volatile reaction products occurring in stoichiometric quantities during the reaction can be drawn off.

Furthermore, other participants in the reaction, such as, for example, starters, acelerators, or such participants in the reaction which are added proportionally, can be added in any zone to the reaction medium passing over the conveying path. For this purpose suitable metering openings can be provided in the extruder. A suitable combination of these numerous possible variations results in the versatile utilizability of the process according to the invention and the associated apparatus for the performance of different chemical processes, without the extruder having to be substantially reconstructed. As a rule not even changes to the or each screw are necessary, since these can readily be performed by interchanging the individual screw element. Independently of this, the start of feeding, the quantity and mixing ratio of the participants in the reaction, the temperature profile of the conveying path, the pressure and/or the screw speed can be provided program-controlled in dependence on the required reaction, thus obtaining a wide spectrum of various reactions which can be performed. Thus, very advantageously the variable data of the operating or reaction conditions can be stored in a data bank and called up in dependence on the required properties of the end products, the result beign universal utilizability. In contrast, the prior art extruders used for the performance of chemical reaction are designed for very particular reactions, so that their utilizability is heavily limited.

The apparatus according to the invention for the performance of the process advantageously has at least one single or multiple screw extruder each with at least five casing compartments which can be tempered separately—i.e., independently of one another. The individual casing components therefore substantially correspond to the temperature zones, and each has its own tampering devices.

The size of the extruder can vary within wide limits having, for example, a bore diameter of 30 to 120 mm or more, the smaller diameters being more suitable for experimental purposes and the larger ones for production purposes. As a rule the length of a compartment corresponds to about five times the bore diameter, although such length can vary within wide limits. Normally between 5 and 15 compartments are provided. The extruders can process solid, liquid or even gaseous starting materials. Two or more extruders can also be connected in cascade, more particularly if volatile monomers are processed or volatile by-products occur.

Also according to the invention two screws can rotate in the same direction of rotation. This is a step which due to the possibility of close meshing substantially improves the satisfactory mixing of the plastics.

According to a further possible feature, the screws are triple-threaded. It has been found that this is the optimum number of threads for extruder screws.

To enable the time spent by the plastics in the individual temperature zones to be varied, according to a further possible feature of the invention the screw have a pitch which alters over their length.

Also according to a possible feature of the invention at least one, preferably each casing compartment has an additional opening. This enables a further additive to be introduced into the extruder at a predetermined place, pressure measuring devices to be connected and/or parts of the reaction medium separated.

According to another possible feature of the invention at least one casing compartment has a degasification opening. At that place gaseous substances can be drawn off, if this is required in accordance with the desired properties. Very advantageously the apparatus also has at least one distillation device, preferably a vacuum distillation device which is connected to an opening in a casing compartment, to enable relatively large quantities of volatile substances to be separated. The intended pressure or negative pressure for distillation can be adjustable, for which purpose the extruder preferably has a throttle upstream of the distillation device. The temperature in the distillation zone is also advantageously kept higher than in the other zones, to increase the vapour pressure of the volatile substances.

To ensure as exact a temperature profile of the extruder as possible, as already mentioned, for tempering purposes a heat vehicling fluid can be provided whose temperature can be altered by mixing with fluid at two different temperatures. The two different temperatures from which the required temperature is mixed are so selected that the required temperature always lies at or between such two values. The heat vehicling fluid used in preferably a liquid which still has adequate viscosity and stability at both temperatures. Suitable for this are thermo-oils which can be used, for example, in the range from 50° to 200° C. or above, and for low temperature ranges also water.

In tempering a suitable control can be used to ensure that the difference in temperature between the fluid at the inlet and the fluid at the outlet does not exceed a predetermined value, so that the temperature differences do not become excessive inside the casing compartment. Also according to the invention the quantity of the fluid flowing through the casing compartment can be altered, in addition to or as an alternative to altering the temperature of the fluid. This is particularly useful if only a small temperature difference between the inlet and the outlet fluid is permitted, to prevent excessive temperature differences from occurring inside the casing compartment. In this case the quantity of the fluid flowing through can be increased.

To enable the temperature to be controlled particularly accurately and rapidly, according to the invention the fluid can be mixed immediately upstream of the entry of the fluid into the casing compartment.

To produce the mixture of fluids from two temperatures, according to the invention each casing compartment can have at least one servovalve with a preferably continuously variable mixing ratio. Different kinds of valves can be used. According to a further feature of the invention, to adjust the correct mixing ratio the servovalve can be influenced by at least one temperature senser via an electronic control to control the temperature in the casing compartment. There are several possible ways of applying the temperature senser and, of course, more than one temperature senser can be provided simultaneously. Either a changeover can be made between the individual temperature sensors, or a combination of the measured values of several temperature sensers can be used as an input valve for the electronic control system.

According to the invention a temperature senser for measuring the temperature of the casing compartment is disposed preferably at a small distance from the inner bore through which the screws extend. Since the casing compartments are made of metal, in this way the temperature can be sensed very satisfactorily. However, a temperature senser for measuring the fluid temperature can also advantageously be disposed at the inlet to the casing compartment. This possibility is valuable particularly if, as already suggested by the invention, a temperature senser for measuring the fluid temperature is disposed at the outlet from the casing compartment. The use of these two temperature sensers ensures that the temperature difference between the inlet and outlet of the casing compartment does not become excessive. Furthermore, the difference in the measured values shows whether an endothermic or an exothermic reaction is taking place in this casing compartment, or whether the temperature therein is stabilizing itself. In that case, for example, the corresponding casing compartment would require neither cooling nor heating.

Another very advantageous location of a temperature senser is in the extruder, to measure the temperature of the melt. As the threads of the screw brush past the casing wall at a small distance, it is of course in any case possible, for example, to allow a temperature senser in the triangle formed between two screw two extend so far into the inside of the casing that the senser is touched by the melt, but not by the screws. This temperature senser then precisely measures the temperature of the plastics present in the extruder compartment, and in this case also conclusions can be drawn from the temperature differences between the plastics and the casing.

The kind of servovalve suggested according to the invention can be constructed in various possible ways. Very advantageously the servovalve is three-way valve with two inlets and one outlet, a branch of a fluid circuit being applied to each inlet, the two branches being at different temperatures. This means that one fluid circuit at the lowest requied temperature is applied to one inlet of the three-way valve, while a fluid circuit at the maximum necessary temperature is applied to the other inlet. In dependence on the position of the servovalve, an outlet temperature can be mixed from the two temperature values which lies between the two extreme values and produces the required temperature in the compartment. Particularly advantageously both circuits have a shunt and a pump each. For example, it may be necessary to cool the whole extruder only so that all valves suddenly admit only the fluid at the lower temperature. The shunt is provided to obviate the necessity of a special for this operational condition, which switches off the pump of the circuit at the higher temperature. This also enables the pump to operate with a relatively high delivery, so that the same pressure ratios and therefore the same control characteristics of the particular valve are present at the inlets of the valves of all the casing compartments.

Also according to the invention at least one, preferably both circuits can have a preferably electric heating system with a temperature control system, the circuit for the lower temperature possible having a heat exchanger for cooling. The heating systems and the cooling system are necessary to ensure that the two fluids circuits actually deliver fluid at a fixed, predetermined temperature, so that then mixing to a precise temperature can be performed.

Also according to the invention the outlets of a number of casing compartments, with the exception of the first one, which is preferably water-cooled, discharge into common return lines which can be subdivided if necessary by valves into two parts of different preferred temperature, the part with the higher and lower temperature respectively being connected to the return of the circuit with the higher or lower temperature respectively. As a result, for example, if actually two parts at a clearly different temperature are provided in the heat profile to be set up, the circuit for the oil at a higher temperature is preferably supplied with oil at a higher temperature. Preferably transverse connections are provided, to even out the return quantities in relation to the outflow quantities.

According to a further feature of the invention, for the tempering of the casing compartment at least a portion of the fluid leaving the casing compartment can be returned. For return purposes a pump can be provided, and the return can also once more be controlled by means of a valve. This step suggested according to the invention is based on the idea that as a rule the temperature of the fluid leaving the casing compartment lies between two extreme temperatures, so that it is enough either to mix the returned fluid with the fluid of lower temperature, or with the fluid of higher temperature, for the tempering of the casing compartment, and this results in a distinct saving of energy. This possible method of return can also be performed with simpler valves, for example, with two or three two-way valves per compartment. This kind of tempering can also be performed with two-way valves or one four-way valve. A controlled pump can also be provided, so that the mixing ratio is regulated by the delivery of the pump. For the extreme case, i.e., for example, the complete cooling of all temperature compartments, in this case also the pump is disconnectable.

To save energy, even with other shunt or bypass devices care must also be taken that return flows or subsidiary flows at the extreme temperatures are united with flows at the same temperature level—i.e., as a rule on the outlet side of the cooling or heating devices, since in this way the heat exchange can be limited to relatively small volumes of liquid, with a somewhat higher temperature difference, and this is more favourable than the opposite.

The participants in the reaction can be mixed in the first zone or zones of the extruder. Preferably at least two participants in the reaction are mixed with one another, if necessary acommpanied by cooling, before they enter the extruder. Further, preferably at least one metering device with a variable metered quantity is provided, more particularly at least two metering pumps with an adjustable stroke being provided which have a common controllable drive. These variables can be also be altered with program control, as can any required pressure at which the starting products are pumped into the extruders.

The process and apparatus according to the invention are more particularly suited for the production of thermoplastics, more particularly such as are suitable for the production of laminated foils or laminated sheets, which are water-tight on one side and water-soluble on the other side. Such foils or sheets are disclosed, for example, in European Offenlegungsschriften Nos. 32 244, 69 296 and 78 553 in the Applicant's name. These are laminated materials comprising at least two layers, one layer being insoluble in water but soluble in an acid or basic medium, while the other layer is soluble or dissolvable in water and contains an acid or basic dissolving intermediary for the layer insoluble in water. The thermoplastics can be produced an processed in extruders connected in parallel and/or in series, the reaction heat reduced during production also being reusable for the melting of starting materials or end products in the same or some different extruder.

DESCRIPTION OF THE DRAWINGS

Further features, details and advantages of the invention can be gathered from the description of preferred embodiments of the invention, with reference to the drawings, wherein.

DETAILED DESCRIPTION OF THE PREFERRED EMBODIMENTS

Figure 1:
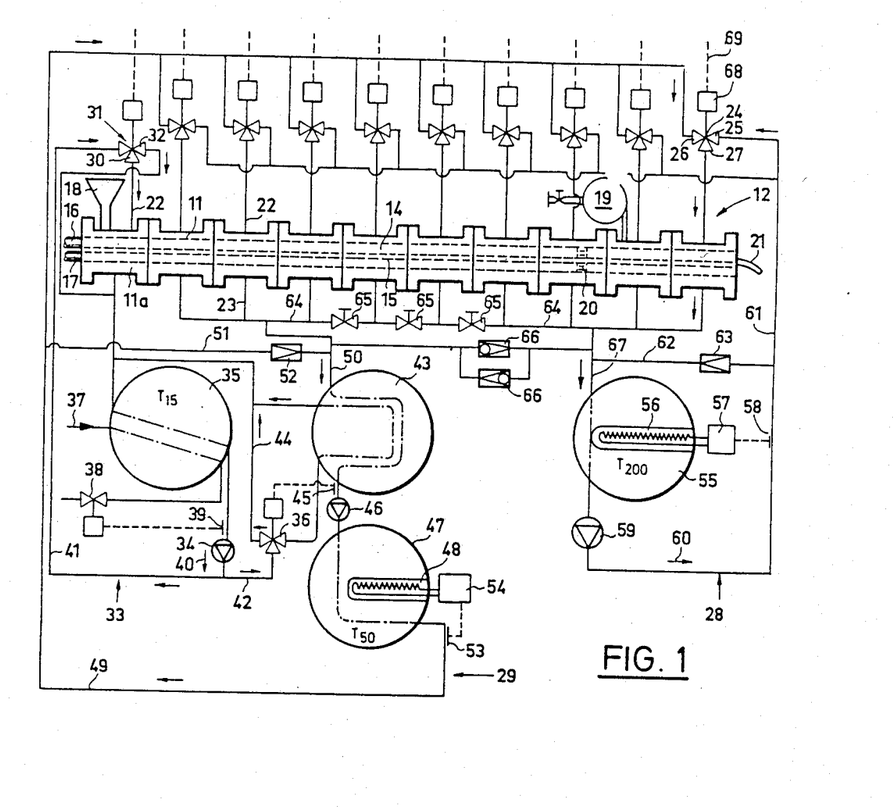
FIG. 1 shows diagrammatically an extruder with fluid circuits for the independent control of the temperature of each casing compartment.
Figure 6:
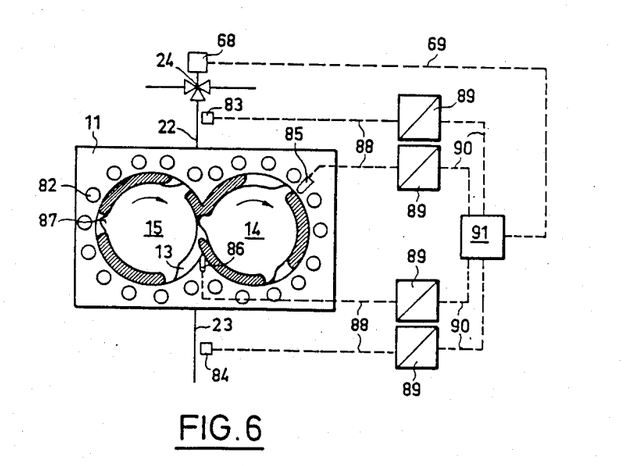
FIG.6 is a diagrammatic cross-section through the extruder, showing the arrangement of the temperature sensers diagrammatically.

FIG. 1 shows diagrammatically an extruder 12 comprising ten casing compartments 11. The extruder 12 has a continuous longitudinal bore in the form of two circular cylinders which partly engage in another (FIG. 6). Disposed in the casing bore 13 are two screws 14, 15 whose drive ends 16,17 extend out of the left-hand side of the extruder 12, where they are driven by a rotary drive; in the embodiment illustrated the two tightly-meshing screws 14,15 rotate in the same direction of rotation (cf. also FIG.6). The extruder is used more particularly for the production of plastics, for example, by substance polymerization.

The conveying direction of the two screws 14,15 in the extruder 12 illustrated in FIG. 1 is from left to right, so that the casing compartment 11a disposed at the left-hand end in FIG. 1 has a diagrammatically illustrated filling funnel 18 or filling spigot for the filling of plasitcs or monomers. Of course, two or more filling openings can also be provided for the filling of various components. If not a reaction, but a mixing is to take place in the casing compartment 11a lying at the start in the conveying direction, and a reaction is to be prevented, only cooling takes place in that casing compartment. For that purpose its own circuit is provided, which will be described in greater detail hereinafter. All the other casing compartments 11 are substantially identically constructed, are screwed to one another and form a continuous unit. The ninth casing compartment (the second from the right in FIG. 1) is connected to a distillation device 19 to which a negative pressure can be applied, so that volatile components can be removed from this last casing compartment but one. A throttle device 20 in the eighth casing compartment prevents monomers not yet reacted from being drawn off from the preceding compartments by the negative pressure. An outlet nozzle 21 for the end product is disposed at the right-hand end of the extruder 12.

In FIG. 1 the fluid or heat vehicling medium circuits are shown in solid lines, the lines shown in chain form being control lines.

Each casing compartment 11 contains (as viewed in FIG. 1) an inlet 22 at the top and an outlet 23 (on its underside in FIG. 1) for the heat vehicling fluid. Disposed immediately upstream of the inlet 22 of each casing compartment 11 is a servo-operated three-way valve 24, each valve having two inlet sides 25,26 and an outlet 27. The outlet side 27 of each three-way valve 24 is connected to the inlet 22 of the casing compartment 11, each inlet 25 being connected to a fluid circuit 28 of higher temperature, and each inlet 26 being connected to a second fluid circuit 29 for a heat vehicling fluid of lower temperature. This applies to all casing compartments 11, with the exception of the first casing compartment 11a in the conveying direction, in which the inlet 22 is actually connected to the outlet 30 of a three-way valve 31, but which has a second outlet 32.

We shall assume that the fluid circuit 28 delivers a heat vehicling oil with a constant temperature of, for example, 200° C., while the fluid circuit 29 delivers the same heat vehicling fluid with a temperature of, for example 50° C.

Provided for the first casing compartment 11a is a third fluid circuit 33 which is, for example, filled with water and can have a temperature of 15°. The fluid circuit 33 comprises a pump 34, a heat exchanger 35, and a second three-way valve 36 in addition to the three-way valve 31. The heat exchanger 35 is provided to maintain the temperature of the water at precisely 15°, for which purpose a line 37 for a coolant is provided which can flow into the heat exchanger 35 in the direction indicated by the arrow. Its flow is controlled by means of a valve 38, which can be controlled from the temperature of the water emerging from the heat exchanger 35 via a temperature 39 immediatlley upstream of the pump 34. The water at the constant temperature of 15° emerges from the pump 34 in the direction shown by arrow 40 and flows through the circuit 33 and line 41 to the valve 31, from where a proportion of the liquid passes through the inlet 22 and the casing compartment 11a and arrives again in the heat exchanger 35. A proportion of the water entering the valve 31 through the line 41 can be guided via the outlet 32 out of the valve 31 past the casing compartment 11a and be reunited with the circuit 33 on the inlet side, or preferably on the outlet side of the heat exchanger 35.

The fluid circuit 33 for water contains a branch 42, so that the water of the fluid circuit 33 can also be used via the valve 36 to cool the fluid circuit 29 by means of heat exchanger 43. That proportion of the water of the circuit 33 which does not pass through the valve 36 into the heat exchanger 43 is returned via line 44 to the inlet side of the heat exchanger 35, or preferably to its outlet side. The valve 36 is influenced by a temperature senser 45 which senses the temperature of the heat vehicling fluid in the fluid circuit 29.

The fluid circuit 29 for the heat vehicling fluid, for example, at the lower temperature, for example 50°, comprises in addition to the heat exchanger 43 a pump 46 and if necessary a tank 47 with an electric heating system 48, a line 49 which extends out of the tank 47 and is connected to the inlet 26 of all the three-way valves 24, and a return line 50 connected to the outlets 23 from the casing compartments 11. A shunt 51 with a filter 52 is also provided. By means of a temperature senser 53, the temperature in the tank 47 is so controlled via a control unit 54 that it is exactly 50° C. If the liquid arriving in the return line 50 is hotter than 50°, it is cooled in the heat exchanger 43 to 50°, this being done by means of the water of the circuit 33. In extrame cases, heating to the required temperature can take place in the tank 47.

The fluid circuit 28 for the heat vehicling fluid at the higher temperature is basically constructed in precisely the same way as the circuit 29, but without a heat exchanger. It therefore comprises a tank 55 with a heating system 56 controlled by a control unit 57 which is connected to a temperature senser 58. A pump 59 delivers the fluid in the direction indicated by arrow 60 to a line 61 connected to the inlets 25 of all the three-way valves 24. As a result all the inlets 25 for the fluid at higher temperature lie parallel with one another, while all the inlets 26 for the fluid at lower temperature also lie parallel with one another.

The fluid circuit 28 also contains a shunt 62 with a filter 63.

The outlets 23 from the casing components are gathered together in a common return line 64 which can be subdivided by means of a number of valves 65 into sections of different preferred temperature. For example, fluid at a high temperature returns to the right of the central valve 25, while fluid at a lower temperature returns at the left of the valve 65. In this case the central valve 65 might be closed, so that both circuits are separated from one another. In order to even out different quantities of required heating agent of higher or lower temperature, in that case a connection between the circuits 28 and 29 is also created on the outlet side. For this purpose a bypass is provided which can comprise, for example, two non-return valves 66 connected in parallel. Of course, it is also possible not quite to close, for example, the central valve 65. Of course, only one of the valves 65 may be closed. The returned temperature might also be differently subdivided, for example, the outer casing compartments being at a low temperature and the central casing compartment at a high temperature. In this case also it will be possible so to connect the lines as to prevent unnecessary mixing of fluid at different temperatures.

In the present case the return line 50 is connected to the left-hand half of the return line 64, the return line 67 of the fluid circuit 28 being connected to the right-hand half of the return line 64.

The valve 31 for the casing compartment 11a and also the valves 24 for the other casing compartments 11, each have a servo drive 68 which adjusts the valve position. The servo drives 68 are operated via control lines 69 shown in chain lines.

FIG. 1 clearly shows each casing compartment 11 can be tempered—i.e., cooled, heated and stabilized at a predetermined temperature—independently of the other casing compartments by the mixing of fluid of two fluid circuits of different temperature.

In the following embodiment the individual casing compartments have their own circuits, to each of which only such a quantity of higher or lower tempered thermo-oil or fluid is apportioned as is necessary to obtain the required temperature in the casing compartment, thus achieving considerable energy savings. If the specific volume of such circuit is low, the system also operates rapidly.

Figure 2:
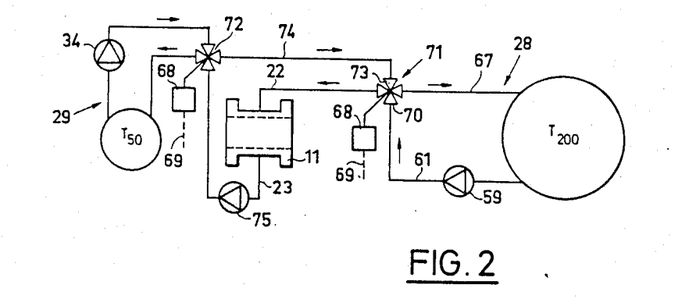
FIG. 2 shows another possible way of precisely tempering a casing compartment.

FIG. 2 shows another possible way of tempering, using differently constructed valves. Only one casing compartment 11 is shown, the circuits 28 and 29 being shown in a simplified manner. The line 61 of the fluid circuit 28 (FIG. 1) discharges into an inlet 70 of a servovalve 71 which can also be actuated by a servo drive 68 operated via a control line 69. From the valve 71 the fluid of the circuit 28 can be connected either to the left, to the inlet 22 of the casing compartment, or to the right, to the return line 67. Applied to the second inlet 73 of the valve 71 is a line 74 extending from a second servovalve 72 which is constructed in precisely the same way as the servovalve 71 in the circuit 28. By means of the servovalve 72 cooler fluid can be admixed with the circuit for the casing compartment 11, which has its own pump 75, in addition to the construction shown in FIG. 1, while hotter fluid can be admixed by means of the valve 71 with the circuit for the casing compartment 11. Of course, only one of these alternatives is ever necessary. The servovalves 71,72 of the embodiment shown in FIG. 2 might therefore be driven by a common servodrive. The other casing components have their own corresponding circuits, which are connected via servo valves to the circuits 28 and 29 of the extremely tempered heating agents.

Figure 3:
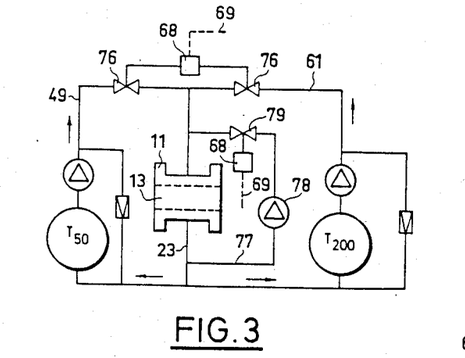
FIG. 3 shows a third embodiment of the tempering of a casing compartment.

In the embodiment shown in FIG. 3, each of the lines 61;49 of the circuits 28;29 are applied to a simple valve 76, both valves 76 being actuable by a common servo drive 68. In the embodiment illustrated in FIG. 3 only one of the two valves 76 need to be open at the same time. The outlet 23 has a branch 77 in which a pump 78 is disposed. Downstream of the pump 78 another simple valve 79 can be disposed which can also be controlled by a servo drive 68. By means of the branch 77 a portion of the fluid leaving the casing compartment 11 can be returned, the temperature of such fluid as a rule lying between the temperatures of the two circuits 28,29. In this case, therefore, a mixing normally takes place between the returned temperature and the lower or higher temperature. This can result in a very considerable saving of energy, since less oil needs to be heated or cooled.

The construction shown in FIG. 3 also has the advantage that no complicated three-way valves or four-way valves with complicated valve cone shapes must be used.

Figure 4:
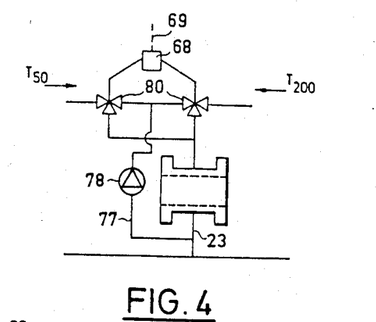
FIG. 4 shows af further way of tempering, using two three-way valves.

In the embodiment illustrated in FIG. 4 also a portion of the fluid leaving the outlet is returned via a branch 77 and a pump 78, the returned portion being applied to the two inlets of two three-way valves 80. Mixing with the fluid from the circuit 29 can be performed with the left-hand three-way valve 80, while mixing with the fluid from the circuit 28 can be performed with the right-hand three-way valve 80. In the embodiment shown in FIG. 4 both three-way valves can be driven from a common servo drive 68, since only one of the two three-way valves 80 ever needs to be opened. In addition, the servovalves 80 shown in FIG. 4 must be differently constructed from those shown in FIG. 1. In the embodiment shown in FIG. 4 both valves 80 must be able to block a flow completely.

Figure 5:
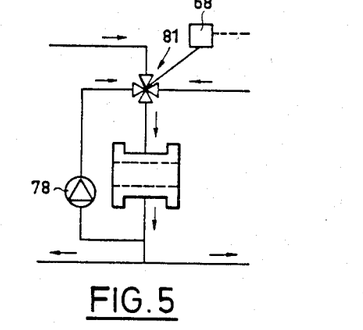
FIG.5 shows a possible way of tempering using a four-way valve.

FIG. 5 shows an embodiment similar to FIG. 4, in which a single four-way valve 81 having a servo drive 68 is substituted for the two three-way valves 80 shown in FIG. 4. The four-way valve 81 has three inlets and one outlet. In the embodiments shown in FIGS. 3 to 5 the pump 78 can be disconnected if there is to be no mixing with the returned temperature.

In the embodiment illustrated in FIG. 3, for example, a pump of controllable flow might be substituted for the valve 79. In that case the different mixing would be performed by the pump of controllable flow.

Each of the embodiments illustrated in FIGS. 2–5 shows only one single casing compartment 11, the hydraulic circuits being correspondingly connected in parallel with an extruder 12 of the kind shown in FIG.

1. The circulating pumps 78 of the compartment circuits can have a common drive.

FIG. 6 is a cross-section through a casing compartment 11 which shows the arrangement of the two screws 14,15 in the casing bore 13. Also seen disposed in the longitudinal direction of the casing compartment are heating agent ducts which take the form of bores and are connected on one side of the casing compartment to the inlet 22, and on the other side to the outlet 23. The inlet 22 and the outlet 23 are shown only diagrammatically. The three-way valve 24 (FIG. 1) is also shown diagrammatically. The arrangements of the temperature sensers can also be seen. A first temperature senser 83 measures the temperature of the fluid in the inlet 22 of the casing compartment 11, while a second temperature sensor 84 senses the temperature at the outlet 23. A further temperature senser 85 is disposed in the metal of the casing compartment 11, the senser 85 extending between two heating agent ducts 82 as far as close to the casing opening 13.

A fourth temperature sensor 86 is disposed in the triangle of the casing bore 13, from which it projects a short distance. It is so disposed that it cannot be touched by the threads 87 of the two screws 14,15. However, it can be seen that the sensor 86 is touched by the plastics material, so that it can measure the temperature thereof.

All the temperature sensors are connected via control lines 88 to measuring transducers 89 which convert the signals delivered by the temperature sensors 83 to 86 into signals which can be further processed. The measuring transducers 89 are connected via further control lines 90 to the actual control apparatus 91. The control apparatus 91 produces the signals required for controlling the servo drive 68 of the valve 24. In the embodiment illustrated in FIG. 6 four temperature sensers are used, so that the control apparatus 91 can process a total of four measured values. However, merely one temperature senser can be used, or the control apparatus 91 can make a selection from the measured values delivered.

The energy balances of chemical reactions performed in the extruder can be calculated from the measured values and the flow quantities of the individual compartments, thus enabling conclusions to be drawn about the course of the reaction. Plastics can also be produced starting from gaseous monomers, if gas-introducing spigots are substituted for the filling funnels and the drive ends 16, 17 of the screws 14,15 extend gas-tight out of the extruder. The extruder, which is preferably constructed pressure-tight, can also have pressure measuring places and removal places for sampling substances.

EXAMPLE 1

400 mole (40 kg) of ethyl acrylate, 100 mole (8.6 kg) of methacrylic acid, 730 g (1.5%) of dilauroyl peroxide and 120 g (0.25%) tetradecyl mercaptan were dissolved in a double-walled tank with agitator, cooled to 20° C., and transferred to an intermediate tank, the homogenous solution being pumped out of the intermediate tank at a rate of 16 kg per hour into the filling zone of an extruder having two tightly-meshing screws rotating in the same direction and a diameter of 60 mm and a length of 2580 mm. The extruder had 10 zones, which could be heated or cooled according to the invention. The filling zone was cooled to 20° C., zones 2 to 4 having a temperature of 100° C., zone 5, 110° C., zone 6, 120° C. Zone 8, which had a temperature of 160° C., had a top attachment for distilling off unpolymerized monomers. Zones 9 and 10 were tempered to 145° C.

With a screw speed of 50 per minute and a current consumption of 40 A, about 0.6 kg of liquid per hour was distilled off (about 96% raw turnover). The polymer was drawn off from the extruder head in five strands, cooled on cooling rollers and granulated. The granulate was degasified in a second extruder at 160° C. in a vacuum of 1 torr, 5% stearic acid being simultaneously compounded in, and the polymer melt was applied at 145° C. by means of a wide-slot nozzle directly on to a 100 μm thick film of hydroxypropyl cellulose (Klucel H of Hercules), containing 20% soda, from an upstream underwinding station, the thickness of the coating being 30 μm.

The whole foil is water-resistant when contacted by water on the side of the coating, while the whole foil dissolves completely when contacted by water on the hydroxypropyl cellulose side.

EXAMPLE 2

400 mole (40 kg) of ethyl acrylate, 100 mole (8.6 kg) of methacrylic acid, 730 g (1.5%) of dilauroyl peroxide and 120 g (0.25%) of tetradecyl mercaptan were dissolved in a double-walled tank with an agitator, cooled to 20° C., and transferred into an intermediate tank. The homogeneous solution was pumped out of the intermediate tank at a rate of 16 kg per hour into the filling zone of an extruder having two tightly-meshing screws rotating in the same direction and a diameter of 60 mm and a length of 2580 mm. The extruder had 10 zones, which could be heated or cooled according to the invention. The filling zone was cooled to 20° C., zones 2 to 8 having a temperature of 105° C., and zones 9 and 10 being tempered to 145° C. The head of the reaction extruder was connected directly via a temperable melt line to a second extruder (in cascade).

The first zone of the second extruder had a top attachment for distilling off unpolymerized monomers. It had a temperature of 160° C. With a screw speed of 50 per minute and a current consumption of 40 A in the first extruder (reaction extruder) 0.15 kg of liquid per hour were distilled off from the distillation top attachment of the second extruder (degasification and compounding extruder) (about 99% crude turnover. In zones 2 to 4 of the compounding extruder the polymer melt was degasified at 160° C. in a vacuum of 1 torr. 5% stearic acid was admixed in zones 5 to 7 at 145° C. whereafter the stearic-acid-containing polymer melt was applied from zone 8 at 145° C. via a wide-slot nozzle, as described in Example 1, to the soda-containing hydroxypropyl cellulose film.

The properties of the whole foil were similar to those described in Example 1.

EXAMPLE 3

100 mole (8.6 kg) of vinyl propyl ether, 300 mole (47.2 kg) of dimethylaminoethyl methacrylate, 280 g (0.5%) of azoisobutyric acid nitrile and 112 g (0.2%) of β-nitrostyrene were dissolved in a double-walled tank with agitator, cooled to 20° C.) and transferred to an intermediate tank. The homogeneous solution was pumped out of the intermediate tank at a rate of 32 kg per hour into the filling zone of an extruder having two tightly-meshing screws rotating in the same direction and a diameter of 60 mm and a length of 2580 mm. The extruder had 10 zones, which could be heated and cooled according to the invention. The filling zone was cooled to 20° C., zones 2 to 8 having a temperature of 120° C., and zones 9 and 10 being tempered to 145° C. The head of the reaction extruder was directly connected via a temperable melt line to a second extruder (in cascade). The first zone of the second extruder had a top attachment for distilling off unpolymerized monomers. It had a temperature of 170° C. With a screw speed of 75 per minute and a current consumption of 30 A in the first extruder (reaction extruder), an average of 2.5 g of liquid per hour was drawn off from the distillation top attachment of the second extruder (degasifying and compounding extruder) (raw turnover about 92%). The polymer melt was degasified at 170° C. in a vacuum of 1 torr in zones 2 to 4 of the compounding extruder. 20% 2-amino-methyl 1,3-propanediol (ammediol, AMPD) was compounded in at 145° C. in zones 5 to 7. Then the AMPD-containing polymer melt was transferred from zone 8 to 145° C. to the first duct of a twin-duct wide-slot nozzle. The stearic-acid-containing polymer melt described in Example 2 and emerging from zone 8 is introduced into the second duct of the wide-slot nozzle, and a laminated foil is produced by coextrusion.

The laminated film had a total thickness of 150 μm. The stearic-acid-containing side of the film (ethyl acrylate-methacrylic acid copolymer) was about 50 μm thick and water-resistant. The AMPD-containing side of the laminated film (dimethylaminoethyl methacrylate-vinylpropyl ether copolymer) was about 100 μm thick; when contacted by water on this side the whole film completely dissolved.

The thermoplastics can be produced and if necessary processed continually by means of one or more extruders, the starting products or mixture thereof being continuously fed to the extruder. After interruptions to operations it is enough to perform controlled heating to melt the products solidified in the extruder, so that production can continue.

What is claimed is:

1. A process for the production of thermoplastic materials from reactant materials by means of chemical reactions in an extruder having individual temperature zones, comprising the steps of:
   conveying reactants into a reactor having a discharge nozzle and at least two extruders connected in cascade and interconnected by a damming means, the reactants being conveyed in a reactant stream of the reactants and products thereof;
   independently controlling temperatures within at least five temperature zones along the stream, and localizing the formation of a reaction product in a temperature zone;
   subjecting the reactant stream to vacuum distillation in a distillation zone along the extruder adjacent said discharge nozzle, and limiting vacuum to said distillation zone by at least one restriction along the reactant stream.

2. The process of claim 1, comprising localizing particular reactions in particular temperature zones by said independently controlling temperatures.

3. The process of claim 1, wherein the temperature controlling step includes subjecting the reactant stream to heat transfer with at least one fluid stream.

4. The process of claim 3, wherein the independent control of temperature is accomplished by controlling at least one of temperature and flow rate of the at least one fluid stream for each temperature zone.

5. The process of claim 3, wherein at least two fluid streams having different temperatures are used for heat transfer for each temperature zone, one of the at least two fluid streams having a temperature below a preselected temperature and another of the at least two fluid streams having a temperature above the preselected temperature, said temperature controlling step including controllably mixing said the two fluid streams with one another in relative proportions providing the preselected temperature, the mixing being done before subjecting the reactant stream to heat transfer at the respective temperature zones.

6. The process of claim 5, wherein a temperature of at least one of the fluid streams differs by less than 5° C. from the selected temperature, and a temperature of at least one other of the fluid streams differs by at least 30° C. from the preselected temperature.

7. The process of claim 5, wherein a temperature of at least one fluid stream is within 3° C. of the preselected temperature, and the temperature of the other fluid stream differs by at least 50° C. from the selected temperature.

8. The process of claim 3, comprising controlling a temperature at each temperature zone by circulating an individual fluid flow substantially through each temperature zone, and achieving the preselected temperature by proportioning fluid inlet streams at different temperatures into the circuit.

9. The process of claim 5, further comprising return flows of the fluid streams from the individual temperature zones into at least two separate main return flows, at least one of the main return flows being cooled and at least one other of the main return flows being heated.

10. The process of claim 5, further comprising controlling delivery speed of the reactant stream such that residence time of the products and reactants in a particular temperature zone is adjusted as a function of heat exchange requirements for that zone.

11. The process of claim 3, further comprising controlling at least one of a flow rate of the fluid stream and delivery speed of the extruder in particular temperature zones to maintain a difference between a temperature of the at least one fluid stream at an inlet to the zone and at an outlet to the zone of less than 3° C.

12. The process of claim 11, wherein the difference between the temperature of the at least one fluid stream at the inlet to the temperature zone and an outlet to the temperature zone is maintained less than 1° C.

13. The process of claim 1, further comprising controlling at least one of quantity of reactants, mixing ratio of reactants, reactant and zone temperatures, pressure, and extruder speed for individual temperature zones by computer, to suit a desired reaction.

14. The process of claim 3, comprising directing the reactant stream through at least one extruder having a driven screw and a casing with at least five casing compartments, the compartments each having fluid ducts with an inlet and an outlet for fluid streams, and individually controlling temperature for each casing compartment.

15. The process of claim 14, comprising conveying the reactant stream with at least one extruder screw having a changing pitch over its length.

16. The process of claims 14, comprising accessing the reactant stream through at least one aperture in each casing for at least one of supplying reactants, removing reactants, removing products and measuring pressure.

17. The process of claim 16, comprising separating condensable substances from the distillation zone.

18. The process of claim 14, comprising controlling temperature by mixing at least two fluid streams having different temperatures, immediately upstream of entry of the fluid into one of the casing compartments, the mixing being accomplished by mixing means having at least one servo valve.

19. The process of claim 18, wherein said mixing is continuously controlled by the servo valve having a continuous alterable mixing ratio.

20. The process of claim 14, further comprising sensing temperatures of at least one of the reactant stream, a particular casing compartment, the fluid inlet to the casing compartment, and the fluid outlet from the casing compartment for individual temperature control of the particular casing compartment.

21. The process of claim 14, comprising controlling the temperature of at least one casing compartment by pumping the fluid through at least one main fluid circuit having at least one shunt.

22. The process of claim 21, a subsidiary fluid circuit for each casing compartment, the subsidiary fluid circuit communicating through mixing means with at least one main fluid circuit.

23. The process of claim 22, comprising pumping the fluid for a plurality of subsidiary fluid circuits using a joint drive.

24. The process of claims 21, further comprising heating at least one fluid stream to a temperature higher than that of the preselected temperature by a heating system spatially separated from the extruder, and regulating the temperature of the fluid at the heating system, including cooling the fluid when necessary by at least one heat exchanger disposed in at least one of the at least one main fluid circuit and the at least one subsidiary fluid circuit.

25. The process of claim 14, comprising circulating the fluid through a fluid outlet of at least one casing compartment and an outlet of at least one subsidiary fluid circuit discharging into a common return line.

26. The process of claim 14, further comprising metering reactant and product of the extruder.

27. The process of claim 26, wherein the metering in done using at least two metering pumps having an adjustable stroke, and a joint controllable drive.

28. The process of claim 1, comprising restricting zones of the reactant stream using a damming device including a line having a delivery means.

29. The process of claim 1, comprising conducting the reactions in at least two extruders connected in series, reactants for production of plastics foils being fed in at an inlet of a first extruder, and a foil being extruded at an end of a last extruder in a continuous process.

30. The process of claim 1, comprising restricting flow by restrictions placed both upstream and downstream of the distillation zone.

* * * * *

UNITED STATES PATENT AND TRADEMARK OFFICE
CERTIFICATE OF CORRECTION

PATENT NO. : 4,612,355

DATED : September 16, 1986

INVENTOR(S) : Roland K. Belz

It is certified that error appears in the above-identified patent and that said Letters Patent is hereby corrected as shown below:

Column 3, line 5, delete "acelerators" and insert --accelerators--.

Column 3, line 27, delete "beign" and insert --being--.

Column 3, line 39, delete "tampering" and insert --tempering--.

Column 4, line 24, delete "in" and insert --is--.

Column 6, line 45, delete "Further" and insert --Furthermore--.

Column 6, line 66, delete "an" and insert --and--.

Column 7, line 16, delete "af" and insert --a--.

UNITED STATES PATENT AND TRADEMARK OFFICE
CERTIFICATE OF CORRECTION

PATENT NO. : 4,612,355

DATED : September 16, 1986

INVENTOR(S) : Roland K. Belz

It is certified that error appears in the above-identified patent and that said Letters Patent is hereby corrected as shown below:

Column 8, line 67, delete "extrame" and insert --extreme--.

Column 12, line 45 before "about" delete the open parentheses "(".

Column 12, line 61 after "C." delete the close parentheses ")".

Signed and Sealed this

Second Day of February, 1988

Attest:

DONALD J. QUIGG

*Attesting Officer*              *Commissioner of Patents and Trademarks*